United States Patent [19]
Huang et al.

[11] 3,855,343
[45] Dec. 17, 1974

[54] ISOPARAFFIN-OLEFIN ALKYLATION WITH REGENERATION OF RESIN/BORON TRIFLUORIDE CATALYST

[75] Inventors: Tracy J. Huang, Trenton, N.J.; Sergei Yurchak, Washington Crossing, Pa.

[73] Assignee: Mobil Oil Corporation, New York, N.Y.

[22] Filed: Nov. 29, 1973

[21] Appl. No.: 420,248

[52] U.S. Cl............. 260/683.44, 252/414, 252/420
[51] Int. Cl.............................................. C07c 3/52
[58] Field of Search ....... 260/683.44; 252/412, 414, 252/420

[56] References Cited
UNITED STATES PATENTS
2,843,642 7/1958 Kelly.............................. 260/683.44
3,647,916 3/1972 Caesar et al................... 260/683.43

Primary Examiner—Delbert E. Gantz
Assistant Examiner—G. J. Crasanakis
Attorney, Agent, or Firm—Andrew L. Gaboriault; Raymond W. Barclay

[57] ABSTRACT

This invention relates to a process for effecting alkylation of an isoparaffin with an olefin in the presence of a catalyst comprising a macroreticular acid cation exchange resin characterized by a surface acid concentration of less than about 0.5 milliequivalents of hydrogen ion per square meter surface area and boron trifluoride, the latter being present in an amount in excess of that required to saturate said resin and regenerating said catalyst, upon decline in activity, by extraction with a polar solvent.

20 Claims, 3 Drawing Figures

ISOPARAFFIN-OLEFIN ALKYLATION WITH REGENERATION OF RESIN/BORON TRIFLUORIDE CATALYST

BACKGROUND OF THE INVENTION

1. Field of the Invention

This invention pertains to regeneration of a catalyst utilized in a process for alkylation by reaction of an isoparaffin and an olefin.

2. Description of the Prior Art

Alkylation achieved as a result of reaction between an isoparaffin and an olefin has heretofore been recognized as resulting in an alkylate product useful as a high octane blending stock in gasoline.

Sulfuric acid and HF alkylation processes have been used for the production of such alkylate. These processes employ liquid-liquid catalytic systems which are known to be expensive and troublesome because of such problems as maintaining an acid/hydrocarbon emulsion, product separation and waste disposal.

In order to overcome such problems, attempts have been made in the past to conduct the desired alkylation in a heterogeneous catalyst system. One such attempt described in U. S. Pat. No. 3,251,902 has involved the use of crystalline aluminosilicate zeolites as catalysts. While certain of such crystalline aluminosilicate zeolites have been found to be effective catalysts for isoparaffin/olefin alkylation, they have the disadvantage of aging rapidly and requiring frequent regeneration to maintain requisite selectivity.

Another approach which has been suggested in the past is the use as a catlyst for effecting the desired isoparaffin/olefin alkylation of a complex of a microreticular or gel type ion exchange resin and boron trifluoride. The use of such complex, although suggested almost 20 years ago, see for example U. S. Pat. No. 2,843,642, has not been adopted on a commercial scale due to side formation of unwanted olefinic products and relatively low selectivity for the desired branched alkylate product.

Since none of the prior heterogeneous catalyst systems suggested for alkylation of an isoparaffin and an olefin has proven to be commercially significant, little or no attention has previously been given to regeneration of the catalyst.

BRIEF DESCRIPTION OF THE DRAWINGS

The invention is described in conjunction with the accompanying drawings in which.

SUMMARY OF THE INVENTION

Figure 1:
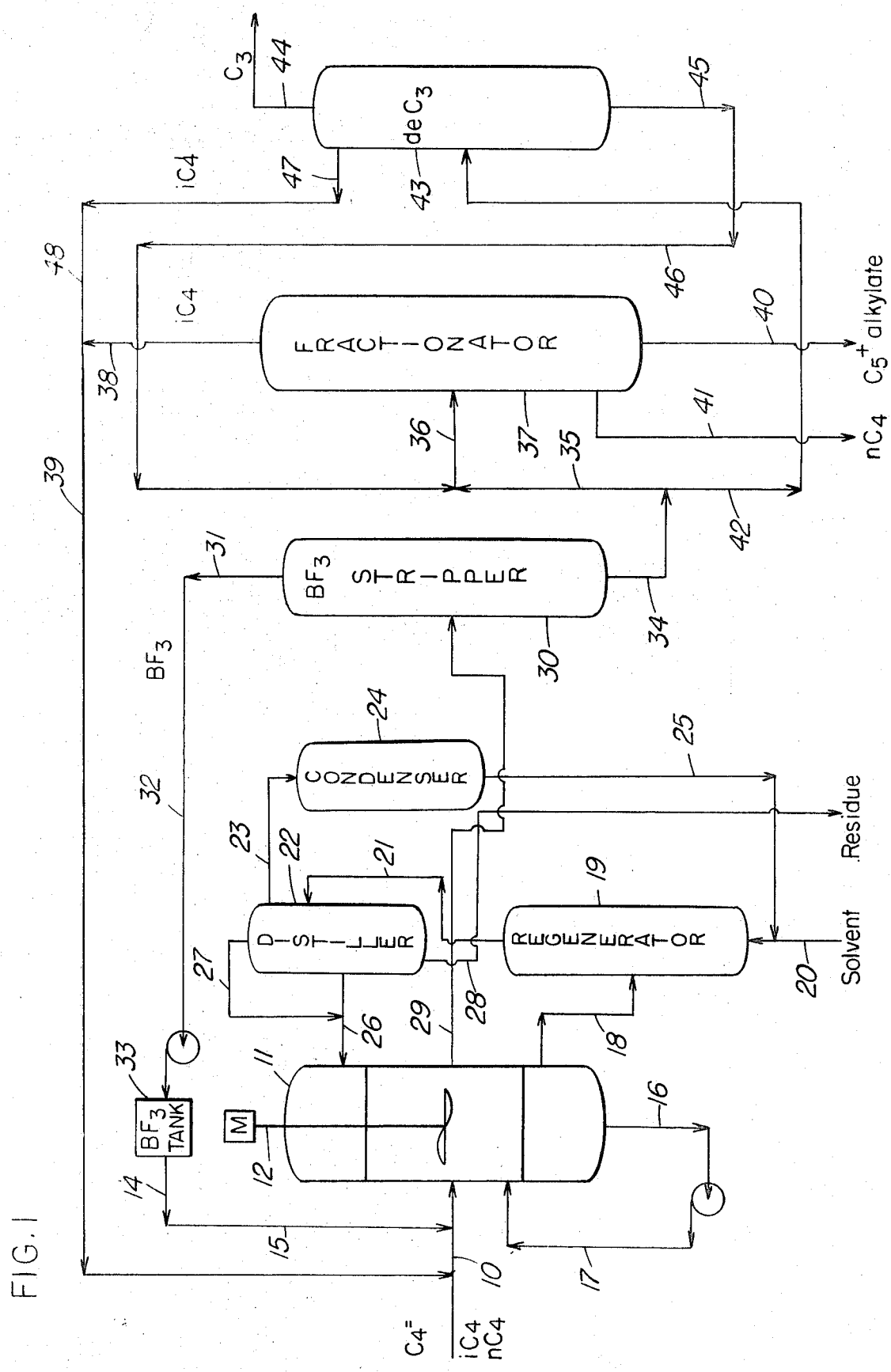
FIG. 1 illustrates a continuous mode of operation including continuous catalyst regeneration.

In accordance with the present invention, there is provided a method for effecting regeneration of an aged catalyst and more particularly the spent macroreticular acid cation exchange resin component thereof, which catalyst when employed in isoparaffin-/olefin alkylation has been found to overcome many of the disadvantages of processes previously employed and/or suggested. The method described herein, in contrast to that of U.S. Pat. No. 2,843,642, utilizes a catalyst which is a complex of a macroreticular acid cation exchange resin and boron trifluoride. The particular class of macroreticular acid cation exchange resins employed are characterized by substantial porosity, high surface area and a low surface acid concentration, generally less than about 0.5 milliequivalents of hydrogen ion per square meter surface area. For effecting the desired alkylation, the cation exchange resin should contain a small amount of water, generally between 0.5 and 20 percent by weight. The use of such catalyst, as more particularly described and claimed in our copending application Ser. No. 409,563, filed Oct. 25, 1973, the disclosure of which is incorporated herein by reference, has been found to unexpectedly result in an attractive yield of alkylate product of high octane number.

The macroreticular resins utilized in the process of this invention are characterized by the presence of acid functional groups and a structure having a high degree of true porosity while possessing rigidity and being subject to minimum volume change when immersed or removed from solvents or solutions.

The macroreticular acid cation exchange resin employed is typified by the presence of sulfonic acid groups, e.g. the sulfonated styrene-divinylbenzene copolymer exchange resins such as those commercially available as Amberlyst-15, Amberlyst XN-1005, Amberlyst XN-1010, Amberlyst XN-1011, Amberlyst XN-1008 and Amberlite 200. The properties of these resins, along with Amberlite IR-120H, a typical microreticular resin are shown below:

| Resin | Macroreticular | | | | | | Microreticular |
|---|---|---|---|---|---|---|---|
| | Amberlyst-15 XN-1005 | Amberlyst- XN-1010 | Amberlyst- XN-1011 | Amberlyst- XN-1008 | Amberlyst- 200 | Amberlite- IR-120H | Amberlite- |
| Skeletal Structure | Styrene-DVB | do. | do. | do. | do. | do. | do. |
| Ionic Functionality | $RSO_3H$ | do. | do. | do. | do. | do. | do. |
| Hydrogen Ion Concentration meq/g dry (Exchange Capacity) | 4.9 | 3.4 | 3.3 | 4.2 | 4.5 | 4.3 | 5.0 |
| Porosity, % | 32 | 42 | 47 | 24 | — | — | 1.8 |
| Avg. Pore Diameter, A° | 200–600 | 80–90 | 40–50 | — | 400–800 | — | — |
| Cross-linkage | ~20 | — | — | — | — | ~20 | 8 |
| Surface Area, $m^2$/g dry | 40–50 | 100–120 | 550–600 | 28 | 30–40 | 40–50 | <0.1 |
| Surface Acid Concentration meq $H^+/m^2$ S.A. | 0.102 | 0.031 | 0.006 | 0.150 | 0.129 | 0.096 | >50 |

Surface acid concentration is determined by dividing the exchange capacity by the surface area in the dry state and is reported as milliequivalents of hydrogen ion per square meter surface area. The lower the surface acid concentration of the resin, the more effective is the resin/$BF_3$ catalyst for alkylation. In general, the surface acid concentration of the resin should be below about 0.5 milliequivalents of hydrogen ion per square meter surface area and preferably between about 0.001 and about 0.2 milliequivalents of hydrogen ion per square meter surface area.

The described resin and $BF_3$ form a complex. Neither $BF_3$ alone nor the resin alone is an effective catalyst for the desired isoparaffin/olefin alkylation. Likewise, the 1:1 complex (resin:$BF_3$) is also ineffective for alkylation. It has been found necessary that the amount of boron trifluoride present be in excess of that required to saturate the resin. Thus, effective macroreticular resin/$BF_3$ alkylation catalysts have been found to be generally characterized by an equivalent ratio of $BF_3$/acid groups of resin exceeding two.

The catalyst and more particularly the cation exchange resin component thereof used in accomplishing the desired alkylation is characterized by a water content of between about 0.5 and about 20 weight percent and preferably between about 1.5 and about 15 weight percent. Cation exchange resins having a water content of less than about 0.5 or greater than about 20 weight percent were not found effective in achieving alkylation. Water can be introduced into the resin by contact with the requisite quanity of liquid water or by exposure to a mositure laden atmosphere for a time sufficient to introduce the desired water content. One suitable way of introducing requisite water to the resin is by equilibrating it with air at 100% relative humidity for a controlled period of time.

Alkylation using the described catalyst is carried out at a temperature below that at which the resin decomposes, i.e. generally below 150°C. A temperature as low as −20°C. or lower may be employed. Generally the temperature, under practical operating conditions, will be within the approximate range of −20°C. to 60°C. A particularly effective temperature range is from about −20°C. to 20°C.

The pressure employed is sufficient to maintain the reactants in the liquid state. In general, the pressure will be between about 50 and about 1500 psig and preferably between about 100 and 500 psig.

The isoparaffin reactant used in the present alkylation process is one having from 4 to 8 carbon atoms. Representative examples of such reactant are isobutane, 3-methylhexane, 2-methylbutane, 2,3-dimethylbutane and 2,4-dimethylhexane.

The olefin reactant employed contains from 2 to 12 carbon atoms. Representative examples are butene-2, isobutylene, butene-1, propylene, ethylene, hexene, octene and heptene. Particularly preferred is a $C_4$ olefin, i.e. butene-1, butene-2 or isobutylene either alone or in admixture.

The molar ratio of isoparaffin to olefin is generally between 2 and 50 and more particularly between about 3 and about 10. The weight ratio of resin to total hydrocarbon, that is isoparaffin, olefin and alkylate generally is between about 0.01 and about 0.5 and more particularly between about 0.4 and about 0.2.

The alkylation operation may be carried out either as a batch, semi-batch, continuous or semi-continuous operation. The time of reaction will be governed by the nature of the isoparaffin and olefin reactants employed, the ratio of such reactants, the temperature and pressure conditions utilized and the particular macroreticular resin/$BF_3$ catalyst used.

The reactants and the catalyst may be contacted in various ways. Thus, the isoparaffin and olefin reactants may be charged to the reactor as separate streams or they may be premixed before charging to the reactor. The catalyst likewise may be first mixed with the isoparaffin or olefin before introduction into the reactor. Desirably, however, preliminary contact between the catalyst and olefin reactant should be minimized to avoid olefin polymerization. The $BF_3$ component of the catalyst may be premixed with the isoparaffin reactant which is then introduced into the reactor with subsequent addition of the olefin reactant. The $BF_3$ may further be introduced into the reaction zone separately from the introduction of the isoparaffin and olefin reactants. The catalyst may be formed in situ by prior introduction of the macroreticular resin into the reactor followed by addition of $BF_3$.

As aforenoted, the desired alkylation may be carried out as a batch or semi-batch type operation. In the case of a batch operation, the isoparaffin and olefin reactants are charged to a closed reactor containing the catalyst, which is thereafter maintained at the desired temperature for the desired time. At the conclusion of the reaction, the hydrocarbon product mixture is withdrawn from the reactor and the alkylate product separated from unreacted materials and side products.

The alkylation process of this invention can also be carried out in continuous fashion, in which instance streams of the isoparaffin, the olefins and boron trifluoride are continuously charged to a reactor containing the macroreticular resin. The reactor is desirably stirred and maintained at the reaction temperature. The reaction mixture product is continuously withdrawn from the reactor, conducted to a vessel wherein $BF_3$ is removed as overhead and recycled to the reactor. The remaining product is conducted to a fractionator in which unreacted isoparaffin is removed as overhead and recycled to the reactor. The desired $C_5$+ alkylate product is withdrawn as bottoms from the fractionator. This product boils in the pentane range and below the maximum temperature usable in gasoline. Generally, the gasoline end point is about 400°F. The alkylate product is usually characterized by a boiling range between that of isopentane and 400°F. A portion of the stream coming off the vessel from which $BF_3$ is removed is conducted to a depropanizer, in which $C_3$ components are removed as overhead and heavier components, removed as bottoms, are recycled to the fractionator. Also, the isoparaffin reactant is suitably removed as a separate stream from the depropanizer and recycled to the reactor.

Upon carrying out isoparaffin/olefin alkylation with the above-described catalyst, it has been observed that both the yield and quality of desired alkylate product declines with time on stream. Thus, the $C_5$-$C_{12}$ yield for isobutane/butene-2 alkylation diminished with duration of the operation. Also, the trimethylpentane content of the $C_5$-$C_{12}$ alkylate decreased with time on stream. Such reduction in yield and quality of the desired alkylate has been established as being attributable to aging of the macroreticular acid cation exchange resin of the catalyst employed.

It has been found that regeneration of the spent macroreticular acid cation exchange resin can be effected by extraction thereof with a polar solvent under suitable conditions of time and temperature. Such treatment has been discovered to restore very substantially or completely the activity of the resin, in conjunction with boron trifluoride, for further isoparaffin/olefin alkylation operation.

The polar solvents suitable for use in effecting the desired regeneration include water, ethers, alcohols, including glycols and ketones, such as acetone.

Particular preference is accorded low molecular weight $C_1$ to $C_5$ alcohols such as methanol, ethanol, butanol, propanol, isopropanol, isobutanol, pentanol and isopentanol. It has established that the solvent employed is necessarily polar. Non-polar solvents such as aromatic hydrocarbons, e.g. benzene, and paraffinic hydrocarbons, e.g. n-hexane, were, as hereinafter demonstrated, not effective in achieving the desired regeneration. In operation, the spent resin is contacted by slurrying or continuous extraction with the selected polar solvent. The duration of such contact will depend on the particular macroreticular resin undergoing treatment, the extent of its deactivation and the nature of the solvent employed. Generally, contact between the spent resin and polar solvent will be maintained for ¼ to 10 hours at a temperature below the boiling point of the solvent and usually within the approximate range of 15°C. to 130°C. The resin so treated is separated from the polar solvent, thereafter dried and is then ready for re-use. It is contemplated that regeneration of the spent resin may take place outside the reaction zone or may be accomplished utilizing in situ techniques. Also, regeneration may be effected as a batch type operation or in a continuous manner as part of an overall continuous alkylation operation.

A suitable system for carrying out such operation is shown in FIG. 1. As will be realized, this described embodiment is schematic in that several items of processing equipment have been omitted for purposes of simplification. Turning to FIG. 1, a stream containing isobutane, butenes along with some normal butane is introduced through line 10 to reactor 11 provided with a stirrer 12. The macroreticular resin has previously been introduced into the reactor. $BF_3$ is introduced from tank 33 through lines 14 and 15 into the reactor. The amount of $BF_3$ introduced is such as to exceed that necessary to saturate the resin. Catalyst slurry is removed from the reactor through outlet 16 and recycled via line 17 to the reactor. A slip stream of catalyst and alkylate is removed via line 18 and conducted to a regenerator 19. Polar solvent is introduced into regenerator 19 through line 20. Contact of the catalyst-alkylate slurry and polar solvent takes place in regenerator 19. A combined stream of solvent and alkylate-catalyst slurry is removed from regenerator 19 through line 21 and conducted into distiller 22 from which the polar solvent is removed as overhead vapor through line 23 and conducted to condenser 24 wherein the solvent vapor is condensed to liquid. Condensed liquid passes from condenser 24 through line 25 and is recycled to solvent inlet line 20. A stream of regenerated catalyst and alkylate is removed from distiller 22 through line 26 and recycled to reactor 11. Light boiling material is removed as overhead through conduit 27 and conducted to line 26. Residue material is removed from distiller 22 through line 28. The hydrocarbon product mixture is removed from a reactor through line 29 and introduced into $BF_3$ stripper 30 from which $BF_3$ is removed as overhead through line 31 and recycled through line 32 to $BF_3$ tank 33. The remaining hydrocarbon mixture is withdrawn from the $BF_3$ stripper through line 34. A portion of such hydrocarbon product is introduced via lines 35 and 36 to fractionator 37. Unreacted isobutane is removed as overhead through line 38 and recycled through line 39 to the reactant feed stream line 10. Desired $C_5+$ alkylate product is withdrawn from the bottom of fractionator 37 through line 40. Any normal butane may be withdrawn from the fractionator through line 41. The remaining portion of the hydrocarbon product mixture passing through line 34 from $BF_3$ stripper 30 is conducted through line 42 to depropanizer 43, from which propane is removed as overhead through line 44. Heavier components are removed as bottoms through line 45 and recycled via lines 46 and 36 to fractionator 37. Isobutane is removed from depropanizer 43 through line 47 and recycled through lines 48 and 39 to the initial reactant feed line 10.

DESCRIPTION OF SPECIFIC EMBODIMENTS

The following examples will serve to illustrate the invention without limiting the same.

EXAMPLE 1

Amberlyst-15 ion exchange resin/boron trifluoride catalyst was aged by continuously alkylating a 10/1 isobutane/butene-2 feed at 0°C. and butene-2 WHSV of 2.5 grams olefin/gram resin/hour for 49 hours on stream at which point the $C_5$–$C_{12}$ yield declined from 1.85 to 1.35 grams $C_5$–$C_{12}$/gram of butene-2 converted and the trimethylpentane content of the $C_5$–$C_{12}$ alkylate declined from 71 weight percent to 51 weight percent.

Regeneration of this spent resin catalyst was effected by slurrying with methanol (methanol/resin = 25 grams/gram) for 4 hours at 40°C., removing the bulk of the methanol from the resin by vacuum filtration, drying the resin at 40°C. under 25 in. mercury vacuum for 5 hours followed by room temperature drying under 25 in. mercury vacuum for 16 hours. The regenerated resin produced an alkylate with a $C_5$–$C_{12}$ yield of 1.75 grams $C_5$–$C_{12}$/gram of butene-2 and a trimethylpentane content of 69 weight percent at 20 hours on stream under the above alkylation conditions.

EXAMPLE 2

Amberlyst XN-1010 cation resin/boron trifluoride catalyst was aged by continuously alkylating a 10/1 isobutane/butene-2 feed at 0°C. and butene-2 WHSV of 2.5 grams olefin/gram resin/hour.

During alkylation, the $C_5$–$C_{12}$ yield declined from 2.00 to 0.22 grams $C_5$–$C_{12}$/gram of butene-2 and the ttrimethylpentane content of the $C_5$–$C_{12}$ alkylate declined from 86 weight percent to 73 weight percent.

Regeneration of this aged resin catalyst was accomplished by extraction in a Soxhlet apparatus. Nine grams of the aged resin were extracted in such apparatus for 3 hours with methanol (400 ml.), then 2 hours with hexane (400 ml.), followed by 1 hour with methanol (400 ml.) and finally with water for 1 hour. All extractions were performed at reflux temperature. The resulting resin was filtered and dried under vacuum at 120°C. for 3 hours prior to use.

The regenerated resin produced an alkylate after 3 hours on stream under the above alkylation conditions with a $C_5$–$C_{12}$ yield of 1.93 grams $C_5$–$C_{12}$/gram of butene-2 and a trimethylpentane yield of 76.5 weight percent.

EXAMPLE 3

Amberlyst XN-1010 cation exchange resin/boron trifluoride catalyst was aged by continuously alkylating a 10/1 isobutane/butene-2 feed at 0°C. and butene-2 WHSV of 2.5 grams olefin/gram resin/hour.

During alkylation, $C_5$–$C_{12}$ yield declined from 1.88 to 0.7 gram $C_5$–$C_{12}$/gram of butene-2 and the trimethylpentane content of the $C_5$–$C_{12}$ alkylate declined from 85 weight percent to 56 weight percent.

The aged resin catalyst (5 grams) was contacted with hexane (250 ml.) in a Soxhlet apparatus for 4 hours. Excess hexane was removed from the extracted resin by drying at 100°C. Water was restored to the resin by equilibrating it with air at 100 percent relative humidity for 2 days. The water content of the resin was reduced to the desired level by drying the resin for 3 hours at 120°C. under 25 in. mercury vacuum.

The resin so treated was tested for rejuvenation by carrying out a semi-batch reactor isobutane/butene-2 alkylation test at 0°C. with a butene-2 WHSV of 2.4 grams butene-2/gram resin/hour and a cumulative isobutane/butene-2 ratio of 5.36 mole/mole. After 1 hour of reaction time under the above conditions, the treated resin produced a $C_5$–$C_{12}$ alkylate with a yield of 0.5 gram $C_5$–$C_{12}$/gram butene-2 and which contained 63.2 weight percent trimethylpentanes.

EXAMPLE 4

Amberlyst XN-1010 cation exchange resin/boron trifluoride catalyst was aged by continuously alkylating a 5/1 isobutane/butene-2 feed at 0°C. and butene-2 WHSV of 2.5 grams/gram resin/hour with a continuous addition of 65 ppm of methanol.

During alkylation, the $C_5$–$C_{12}$ yield declined from 1.86 to 1.25 grams $C_5$–$C_{12}$/gram of butene-2 and the trimethylpentane content of the $C_5$–$C_{12}$ alkylate declined from 91 weight percent to 60 weight percent.

The aged resin catalyst was slurred in a methanol/alkylate solution. The source of this alkylate was the liquid product obtained from isobutane/butene-2 (cumulative ratio = 5.36 mole/mole) alkylation in a semi-batch reactor with Amberlyst XN-1010/$BF_3$ catalyst at 6°C. and a WHSV of 2.4 grams olefin/gram resin/hour. The alkylate was obtained by weathering the reactor liquid at room temperature and atmospheric pressure. The methanol/alkylate/resin weight ratio was 5/1/1. The slurry was stirred for 4 hours at 60°C., vacuum filtered to remove liquid (5 ml. methanol were used to facilitate transfer) and air dried on the vacuum filter for 5 minutes.

The resin so treated was tested for rejuvenation by carrying out a semi-batch reactor isobutane/butene-2 alkylation test at 0°C. with an olefin WHSV of 2.4 grams butene-2/gram resin/hour and a cumulative isobutane/butene-2 ratio of 5.36 mole/mole. After 1 hour of reaction time under the above conditions, the treated resin produced a $C_5$–$C_{12}$ alkylate with a yield of 2.1 grams $C_5$–$C_{12}$/gram butene-2 and which contained 62 weight percent trimethylpentanes.

EXAMPLE 5

Amberlyst XN-1010 cation exchange resin/boron trifluoride catalyst was aged by continuously alkylating a 2/1 iosubtane/butene-2 feed at 0°C. and butene-2 WHSV of 2.5 grams olefin/gram resin/hour for 30 hours at which point the $C_5$–$C_{12}$ yield declined from 1.85 to 1.35 grams $C_5$–$C_{12}$/gram butene-2 converted and the trimethylpentane content of the $C_5$–$C_{12}$ alkylate declined from 81 to 51 weight percent.

The liquid and gaseous contents of the reactor were drained, and isobutane and boron trifluroide were then charged to the reactor. As soon as the reactor attained a temperature of 0°C., 0.67 g water/g resin was injected directly into the reactor all at once, and 2/1 isobutane/butene-2 feed and boron trifluoride were fed continuously to the reactor as above. After 17 hours on stream, the $C_5$–$C_{12}$ yield declined from 1.71 to 1.66 grams $C_5$–$C_{12}$/gram butene-2 converted and the trimethylpentane content of the $C_5$–$C_{12}$ alkylate decreased from 67 to 53 weight percent.

The aged macroreticular resin was contacted with 500 ml. benzene in a Soxhlet apparatus for 4 hours. Excess benzene was removed by rinsing the resin with hexane followed by an extraction with hexane (500 ml.) in a Soxhlet apparatus for 2 hours. Residual hexane was removed from the resin by drying it for about 16 hours at 120°C. at a total pressure less than 1 mm. Hg. The dried resin was then placed in a moist environment (air at 100 percent relative humidity) for 4 hours and dried for 3 hours at 120°C. under 25 in. Hg vacuum prior to use.

After processing a 5/1 isobutane/butene-2 feed for 3 hours at 0°C. and 2.5 olefin WHSV, the resin so treated was found to produce an alkylate with a $C_5$–$C_{12}$ yield of only 0.3 gram $C_5$–$C_{12}$/gram butene-2 converted, thereby showing that use of benzene as a solvent did not afford the desired regeneration.

EXAMPLE 6

Amberlyst-15 cation exchange resin/boron trifluoride catalyst was aged by continuously alkylating a 10/1 isobutane/ butene-2 feed at 0°c. and butene-2 WHSV of 2.5 grams/gram resin/hour.

During alkylation, $C_5$–$C_{12}$ yield declined from 1.88 to 1.35 grams $C_5$–$C_{12}$/gram of butene-2 converted and the trimethylpentane content of the $C_5$–$C_{12}$ alkylate declined from 70 weight percent to 50 weight percent.

This aged catalyst was then regenerated four times using four different methods and after each regeneration the catalyst was tested for alkylation under the above conditions until the $C_5$–$C_{12}$ yield declined to less than 1.0 gram $C_5$–$C_{12}$/gram of butene-2 converted. Inn the fifth cycle of alkylation test the $C_5$–$C_{12}$ yield declined from 1.86 to 0.82 grams $C_5$–$C_{12}$/gram of butene-2 converted and the trimethylpentane content of the $C_5$–$C_{12}$ alkylate declined from 80 weight percent to 45 weight percent.

Regeneration of the aged catalyst from the fifth cycle of alkylation test was accomplished by slurrying it with acetone (acetone/resin = 27 grams/gram) for 4 hours at 40°C., removing the acetone regenerant by filtration followed by vacuum drying at 40°C. for 4 hours and then at room temperature for overnight.

The regenerated resin produced an alkylate with a $C_5$–$C_{12}$ yield of 1.62 grams $C_5$–$C_{12}$/gram of butene-2 converted and a trimethylpentane content of 69 weight percent at 2 hours on stream under the above alkylation conditions.

EXAMPLE 7

Amberlyst XN-1010/$BF_3$ catalyst was aged by continuously alkylating a 5/1 isobutane/butene-2 feed at 0°C. and 2.5 olefin WHSV until the yield declined to 0.7 gram $C_5$–$C_{12}$/gram $C_4$ olefin converted at which point the trimethylpentane content of the $C_5$–$C_{12}$ alkylate was 53 weight percent. The liquid and gaseous materials were removed from the reactor and the resin was washed once with isobutane liquid. The isobutane was drained and then the resin was removed from the reactor.

A portion of the aged resin was subjected to water extraction in a Soxhlet apparatus for 4 hours and then dried for 3 hours at 120°C. under 25 in. Hg vacuum. This resin was tested for alkylation activity in a semi-batch reactor which contained isobutane, resin and $BF_3$. Butene-2 was added continuously to the reactor at an olefin WHSV of 2.26 for 3 hours. Analysis of the reactor liquid showed that alkylate was produced with a yield of 1.2 grams $C_5$-$c_{12}$/gram $C_4$ olefin converted and which contained 50.8 weight percent trimethylpentanes.

Figure 2:
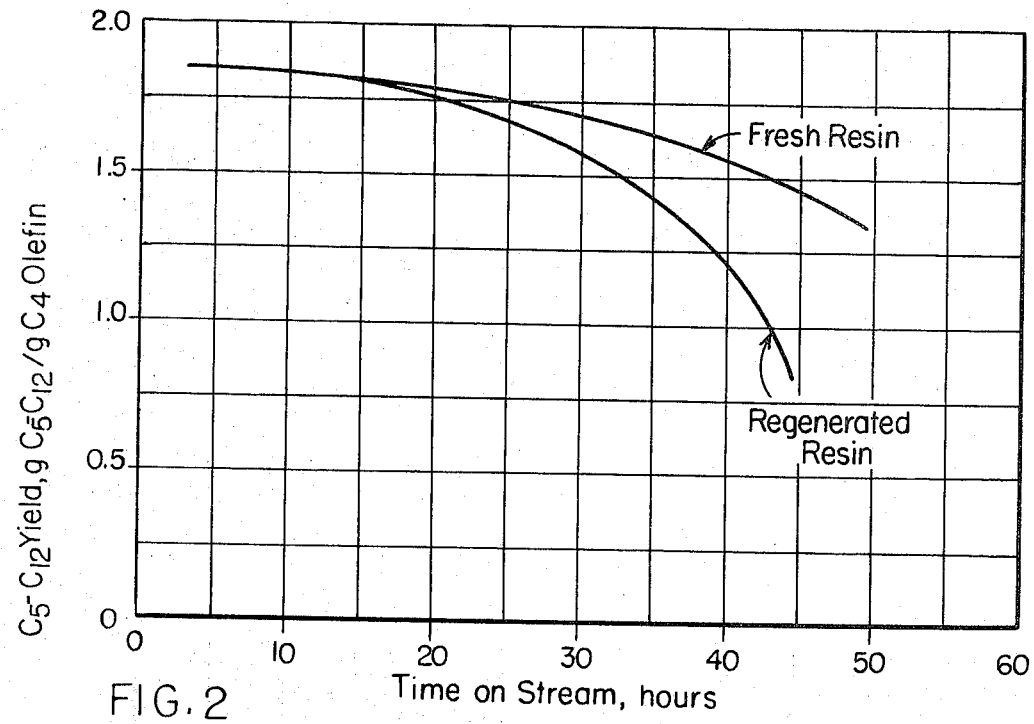
FIG. 2 depicts the alkylate yield performance of fresh and regenerated catalyst.

The enhanced results obtained utilizing a macroreticular resin/boron trifluoride catalyst regenerated by the method described herein are shown by the results set forth graphically in FIG. 2. Referring to this figure, the $C_5$-$C_{12}$ yield characteristics of fresh and regenerated resin are shown for isobutane/butene-2 alkylation using Amberlyst 15/boron trifluroide catalyst at 0°C. and 2.5 olefin WHSV. After 49 hours on stream, the $C_5$-$C_{12}$ yield dropped from 1.85 to 1.35 grams $C_5$-$C_{12}$ alkylate/gram $C_4$ olefin. The aged resin was then regenerated by the method described in Example 1.

From the results shown, it is evident that equivalent yield performance was obtained by the regenerated resin up to about 20 hours on stream.

Figure 3:
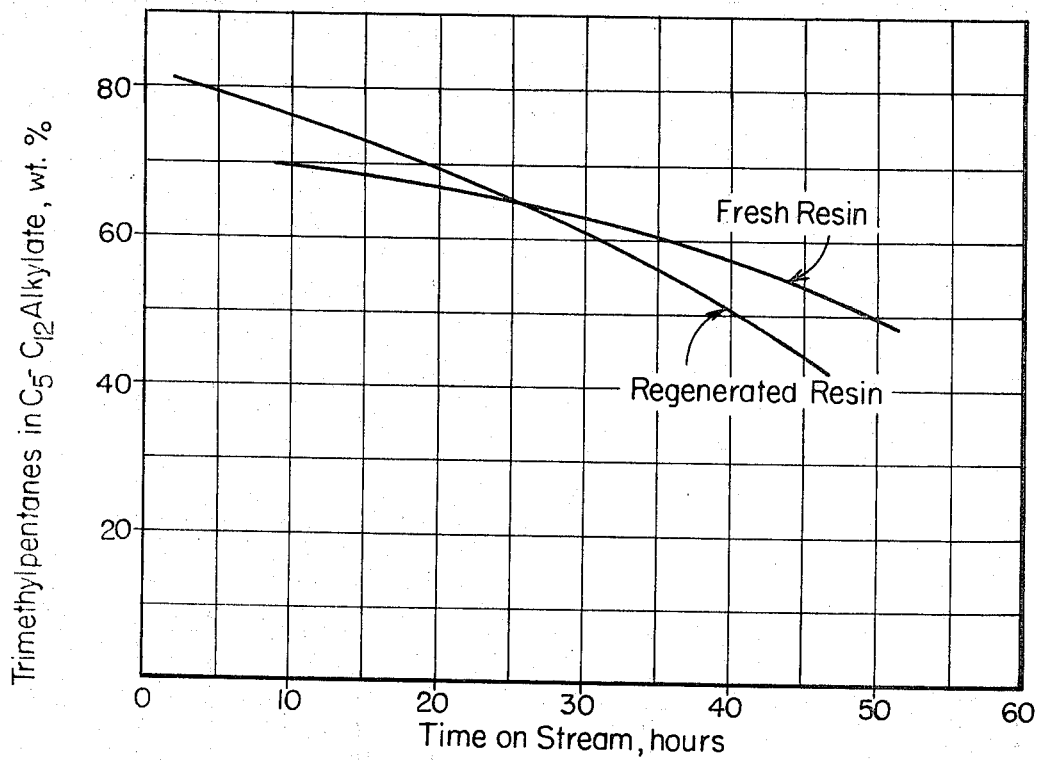
FIG. 3 depicts the alkylate quality achieved with fresh and regenerated catalyst.

FIG. 3 shows that the regeneration method described in Example 1 also restores the macroreticular resin in terms of product quality, i.e. the trimethylpentane content of the $C_5$-$C_{12}$ alkylate. After 50 hours on stream, the alkylate produced by reaction of isobutane and butene-2 using Amberlyst 15/boron trifluoride catalyst at 0°C. and 2.5 olefin WHSV contained only 50 weight percent trimethylpentanes. After regeneration, the alkylate produced by the resin after 10 hours on stream contained 76 weight percent trimethylpentanes, a quantity which was greater than that produced by the fresh resin at any time on stream.

The importance of the type of solvent used to perform the regeneration is illustrated by the results of Examples 3 and 5. In these examples, regeneration of the aged macroreticular resin was attempted using a paraffinic non-polar solvent, i.e. hexane and benzene respectively. As evident, no significant improvement in $C_5$-$C_{12}$ yield was obtained.

The fact that the presence of alkylate during regeneration utilizing the polar solvent technique of the present invention does not destroy the effectiveness of such method to restore activity to the aged macroreticular resin is shown by the results of Example 4. In this example, the $C_5$-$C_{12}$ yield was 1.25 grams/gram of butene-2 while after regeneration, such yield increased to 2.1 grams/gram of butene-2.

It is to be understood that the foregoing description is merely illustrative of preferred embodiments of the invention of which many variations may be made by those skilled in the art within the scope of the following claims without departing from the spirit thereof.

We claim:

1. An alkylation process which includes regeneration of a spent marcoreticular acid cation exchange resin characterized by a water content between about 0.5 and about 20 weight percent and a surface acid concentration of between 0.001 and about 0.5 milliequivalents of hydrogen ion per square meter surface area which comprises extracting said resin with a polar solvent, separating the spent resin so regenerated from said solvent and reusing the regenerated resin in the process which led to its deactivation, said process comprising alkylating an isoparaffin having from 4 to 8 carbon atoms with an olefin containing from 2 to 12 carbon atoms by contacting said isoparaffin and said olefin, in the liquid state with a catalyst in an alkylation reaction zone maintained at a temperature between about −20°C. and 150°C., said catalyst comprising a complex of said resin and boron trifluoride, said boron trifluoride being present in an amount in excess of that needed to saturate the resin to form said complex, the molar ratio of said isoparaffin to said olefin being between about 2 and 50, withdrawing a hydrocarbon product mixture from said reacting zone and separating an alkylate hydrocarbon product from said mixture.

2. The method of claim 1 wherein said polar solvent is water.

3. The method of claim 1 wherein said polar solvent is an alcohol.

4. The method of claim 1 wherein said polar solvent is a $C_1$-$C_5$ alcohol.

5. The method of claim 1 wherein said polar solvent is methanol.

6. The methanol of claim 1 wherein said temperature is between about −20°C. and 60°C.

7. The method of claim 1 wherein said surface acid concentration is between 0.001 and 0.2 milliequivalents of hydrogen ion per square meter surface area.

8. The method of claim 1 wherein said resin consists essentially of a macroreticular sulfonic acid cation exchange resin.

9. The method of claim 1 wherein said catalyst is characterized by an equivalent ratio of $BF_3$ to acid groups in said complex which exceeds 2.

10. The method of claim 1 wherein said olefin contains 4 carbon atoms.

11. The method of claim 1 wherein said isoparaffin is isobutane.

12. The method of claim 1 wherein said molar ratio of isoparaffin to olefin is between about 3 and about 10.

13. The method of claim 8 wherein said macroreticular sulfonic acid cation exchange resin is a sulfonated sytrenedivinylbenzene copolymer.

14. A continuous process for alkylating an isoparaffin having from 4 to 8 carbon atoms with an olefin containing from 2 to 12 carbon atoms in the presence of a catalyst complex comprising a macroreticular acid cation exchange resin and boron trifluoride and continuously regenerating said catalyst which comprises continuously introducing streams of said isoparaffin, olefin and boron trifluoride into a reactor containing said resin, said resin being characterized by a water content between about 0.5 and about 20 weight percent and a surface acid concentration of between 0.001 and 0.5 milliequivalents of hydrogen ion per square meter surface area, the molar ratio of said isoparaffin to said olefin being between about 2 and about 50 and said boron trifluoride being present in said reactor in an amount in excess of that need to saturate the resin, to form said catalyst complex, continuously stirring the resulting mixture at a sufficient rate and for a sufficient period of time at a temperature between about −20°C. and 150°C. to effect isoparaffin/olefin alkylation, continuously withdrawing a stream of alkylate-containing hydrocarbon and spent catalyst from said reactor, conducting said stream to regenerator wherein said spent catalyst is extracted with a polar solvent, continuously removing said solvent from the resulting mixture, continuously returning the regenerated catalyst and alkylate-containing hydrocarbon to said reactor, continuously withdrawing the resulting hydrocarbon product mixture from said reaction zone and continuously separating an alkylate hydrocarbon product from said mixture.

15. The process of claim 14 wherein said temperature is between about −20°C. and 60°C.

16. The process of claim 14 wherein said surface acid concentration is between 0.001 and 0.2 milliequivalents of hydrogen ion per square meter surface area.

17. The process of claim 14 wherein said resin consists essentially of a macroreticular sulfonic acid cation exchange resin.

18. The process of claim 14 wherein said polar solvent is water.

19. The process of claim 14 wherein said polar solvent is a $C_1$–$C_5$ alcohol.

20. The process of claim 14 wherein said polar solvent is methanol.

* * * * *

PO-1050
(5/69)

UNITED STATES PATENT OFFICE
CERTIFICATE OF CORRECTION

Patent No. 3,855,343      Dated December 17, 1974

Inventor(s) TRACY J. HUANG and SERGEI YURCHAK

It is certified that error appears in the above-identified patent and that said Letters Patent are hereby corrected as shown below:

Column 6, line 43, after "cation" insert --exchange--.

Column 6, line 49, "ttrimethylpentane" should be --trimethylpentane--.

Column 10, line 2, after "said" insert --spent--.

Column 10, line 3, delete "spent" after "the".

Column 10, line 48, "sytrenedivinylbenzene" should be --styrenedivinylbenzene--.

Column 10, line 59, after "and" insert --about--.

Column 10, line 64, "need" should read --needed--.

Signed and sealed this 4th day of March 1975.

(SEAL)
Attest:

RUTH C. MASON
Attesting Officer

C. MARSHALL DANN
Commissioner of Patents
and Trademarks